United States Patent
Rollins

(10) Patent No.: US 7,461,139 B2
(45) Date of Patent: Dec. 2, 2008

(54) NETWORK COMPUTER PROVIDING MASS STORAGE, BROADBAND ACCESS, AND OTHER ENHANCED FUNCTIONALITY

(75) Inventor: Doug Rollins, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 1198 days.

(21) Appl. No.: 09/932,241

(22) Filed: Aug. 17, 2001

(65) Prior Publication Data
US 2003/0037120 A1    Feb. 20, 2003

(51) Int. Cl.
*G06F 15/177* (2006.01)
*G06F 13/28* (2006.01)

(52) U.S. Cl. .............. 709/220; 709/221; 709/222; 711/166

(58) Field of Classification Search .............. 709/217, 709/208, 200, 220–222; 711/1, 166; 707/1
See application file for complete search history.

(56) References Cited

U.S. PATENT DOCUMENTS

| | | | | |
|---|---|---|---|---|
| 5,699,503 | A * | 12/1997 | Bolosky et al. ............... 714/6 |
| 6,301,666 | B1 * | 10/2001 | Rive ......................... 713/200 |
| 6,370,614 | B1 * | 4/2002 | Teoman et al. .............. 711/113 |
| 6,434,608 | B1 * | 8/2002 | Desai ........................ 709/217 |
| 6,463,509 | B1 * | 10/2002 | Teoman et al. .............. 711/137 |
| 6,532,493 | B1 * | 3/2003 | Aviani et al. ................ 709/224 |
| 6,760,812 | B1 * | 7/2004 | Degenaro et al. ........... 711/133 |
| 6,807,581 | B1 * | 10/2004 | Starr et al. ................. 709/250 |
| 2001/0039567 | A1 * | 11/2001 | Baker et al. ................ 709/203 |
| 2002/0053044 | A1 * | 5/2002 | Gold et al. ................... 714/38 |
| 2002/0053047 | A1 * | 5/2002 | Gold ......................... 714/45 |
| 2002/0059539 | A1 * | 5/2002 | Anderson .................... 714/6 |
| 2002/0129128 | A1 * | 9/2002 | Gold et al. ................. 709/220 |
| 2002/0152305 | A1 * | 10/2002 | Jackson et al. ............. 709/224 |
| 2002/0169887 | A1 * | 11/2002 | MeLampy et al. .......... 709/231 |
| 2002/0176427 | A1 * | 11/2002 | Noda et al. ................. 370/401 |
| 2002/0184327 | A1 * | 12/2002 | Major et al. ................ 709/213 |
| 2002/0188887 | A1 * | 12/2002 | Largman et al. ............. 714/13 |
| 2003/0033606 | A1 * | 2/2003 | Puente et al. ............... 725/110 |
| 2003/0112772 | A1 * | 6/2003 | Chatterjee et al. .......... 370/316 |
| 2003/0135350 | A1 * | 7/2003 | Cheston et al. ............. 702/186 |
| 2004/0015687 | A1 * | 1/2004 | Chiarabini et al. .......... 713/153 |
| 2004/0255007 | A1 * | 12/2004 | Salo et al. .................. 709/219 |

* cited by examiner

*Primary Examiner*—William C. Vaughn, Jr.
*Assistant Examiner*—Peling A Shaw
(74) *Attorney, Agent, or Firm*—Dorsey & Whitney LLP

(57) ABSTRACT

A network computer system includes a processor and a memory device coupled to the processor. The memory device contains an embedded operating system that is executed by the processor, the embedded operating system including at least one system parameter. A first reset device coupled to the memory device sets at least one of the system parameters of the embedded operating system to a desired value when activated. A network communication circuit allows the processor to communicate over a computer network with computer resources coupled to the network. A mass storage device includes a user preferences partition and a user file data partition that contain user preference data and user file data, respectively, that may be accessed by the processor. A second and a third reset device are coupled to the mass storage device, and set the user preference data and user file data to desired values, respectively, when activated.

29 Claims, 3 Drawing Sheets

NETWORK COMPUTER PROVIDING MASS STORAGE, BROADBAND ACCESS, AND OTHER ENHANCED FUNCTIONALITY

TECHNICAL FIELD

The present invention relates generally to computer systems, and, more specifically, to Internet appliances or network computers for providing access to a computer network such as the Internet.

BACKGROUND OF THE INVENTION

The Internet has provided millions of people worldwide with access to seemingly limitless amounts of information. While people in some less-developed countries are awaiting access to the Internet as required infrastructure is being put in place, in the industrialized countries, such as the United States, people throughout the country can readily access the Internet. In order to access the Internet, a person merely needs a network access device running appropriate software and including the appropriate hardware. Typically, the network access device is a personal computer including software which includes a Web browser and a communications package that provides access to the Internet via an Internet Service Provider, and hardware which includes a conventional modem or broadband access device.

FIG. 1 is a functional block diagram illustrating a conventional personal computer system 100 coupled to the Internet 102 through either a conventional plain old telephone system (POTS) communications link 104 or through a broadband communications link 106. The computer system 100 includes a processor 108, which includes a microprocessor (not shown), that executes programs and stores data in a memory 110. The computer system 100 further includes input devices 112 such as a keyboard and mouse to allow a user to provide input to a program running on the processor 108, and also includes output devices 114 such as a display screen to allow the processor to provide output to a user of the system. A mass storage device 116 stores user preference data 118, user file data 120, and an operating system 122, which the processor 108 accesses through an intelligent drive electronics (IDE) controller logic circuit 124. The mass storage device 116 may be a hard disk, CD-RW drive, or other suitable mass storage device, as will be appreciated by those skilled in the art.

An Ethernet logic circuit 126 provides the processor 108 with a high speed communications channel over which the processor communicates with a broadband bridge device 128, which is coupled to the Ethernet logic circuit through a conventional RJ-45 jack 130. The broadband bridge device 128 is typically a cable modem or digital subscriber line (DSL) modem that transfers data to and from the processor 108 through the Ethernet logic circuit 126 and transfers data to and from the Internet 102 via the broadband communications link 106. A modem a logic circuit 132 is coupled through a conventional RJ-11 jack 134 to the POTS communications link 104 and provides the processor 108 with an alternative low-speed communications channel over which the processor can access the Internet 102. Typically, the computer system 100 will utilize only one of the Ethernet logic circuit 126 and the modem logic circuit 132 in accessing the Internet 102, as will be appreciated by those skilled in the art. The computer system 100 further includes a peripheral component interconnect (PCI) logic circuit 136 through which the processor 108 communicates with peripheral components (not shown) coupled to a PCI bus 138.

In the computer system 100, the memory 110 typically includes random access memory (RAM) (not shown) for storing programs being executed by the processor 108 and for storing data associated with those programs. The memory 110 also typically includes a FLASH memory (not shown) for storing basic input/output system (BIOS) software that determines how the processor 108 controls basic functions of the computer system 100 such as communications with input devices 112 like a keyboard and communications with output devices 114 like a display. The BIOS software also includes an initialization or "boot" program that the processor 108 executes when the computer system 100 is first turned on or reset, as will be appreciated by those skilled in the art. During execution of the boot program, the processor 108 transfers the operating system 122 into the RAM (not shown) portion of the memory 110. The operating system 122 along with other programs being executed by the processor 108 are stored in the memory 110 because the processor can access data stored in the memory 110 much more quickly than data stored in the mass storage device 116. The operating system 122 may be any of a variety of conventional operating systems such as Windows, DOS, UNIX, or LINUX.

Any of these conventional operating systems 122 is a very complex program that may include millions of lines of software code and occupy megabytes memory. Moreover, the operating system 122 provides a user with a myriad of configuration options and wide range of functionality, both of which are much more than the average user requires or desires. As a result of the complexity of the operating system 122, it is typically relatively complex to install, configure, and support, and misconfiguration of the operating system 122 may result in a nonfunctional computer system 100. For example, a simple omission of a character in an essential configuration file of the operating system 122 can render the computer system 100 inoperable, with operability being restored only upon a lengthy and involved process of real running the operating system.

In today's Internet-dominated world, many users simply want to obtain access to the Internet and do not want or need the power of the conventional computer system 100. Moreover, many users cannot justify the expense of purchasing a conventional computer system 100 merely to utilize the system an Internet-access device. For these types of users, a new type of Internet-access device known as an Internet appliance or network computer has been developed. FIG. 2 is a functional block diagram illustrating a conventional network computer 200 coupled to the Internet 202 through a conventional POTS communications link 204. The network computer 200 includes a processor 202 that executes programs stored in a FLASH memory 204 under control of an embedded operating system 206, which is also stored in the FLASH memory. A reset device 207, such as a push-button switch, resets configurable parameters of the embedded operating system 206 in the event the network computer 200 "locks up" during operation, which may occur, for example, if the user misconfigures the embedded operating system, as will be appreciated by those skilled in the art. A modem a logic circuit 206 is coupled through a conventional RJ-11 jack 208 to the POTS communications link 204 and provides the processor 202 with a conventional low-speed communications channel over which the processor can access the Internet 202. The network computer 200 may also include a universal serial bus (USB) logic circuit 210 and USB port 212 through which the processor 202 communicates with peripheral devices coupled to the USB port. The network computer 200 further includes input devices 214 such as a keyboard and mouse to allow a user to provide input to the program running on the processor 202, and also includes output devices 216 such as a display screen to allow the processor to provide output to a user of the network computer.

The network computer 200 is designed to be a low cost alternative to the conventional computer system 100 for users that merely require a device for accessing the Internet. Accordingly, the network computer 200 typically includes no mass storage device and includes no broadband access components to reduce the cost of the network computer. The functional requirements of the network computer 200 are relatively simple when compared to the conventional computer system 100 and thus there is no need for the powerful and sophisticated conventional operating system 122. The embedded operating system 206 is a simplified version of the conventional operating system 122, resulting in the embedded operating system being much smaller than the conventional operating system. This allows the embedded operating system 206 to be stored in the FLASH memory 204 and eliminates the need for a mass storage device.

While the network computer 200 is intended to be a low cost alternative to the conventional computer system 100 for users merely requiring an Internet-access device, many users are dissuaded from purchasing the network computer due primarily to the low-speed Internet-access and lack of mass storage. For example, most users accessing the Internet will want to download files of various types, such as audio or video files, and the limited storage capacity provided by the FLASH memory 204 provides insufficient capacity to store a reasonable number of downloaded files. As a result, many users forego the purchase of a network computer and instead purchase a conventional computer system merely to obtain broadband Internet-access and sufficient mass storage capacity to download desired files.

There is a need for a network computer that provides users with desired functionality without introducing the complexities and costs associated with conventional computer systems.

SUMMARY OF THE INVENTION

According to one aspect of the present invention, a network computer system includes a processor and a memory device coupled to the processor. The memory device contains an embedded operating system that is executed by the processor. A network communication circuit is coupled to the processor and is adapted to allow the processor to communicate over a computer network with computer resources coupled to the network. A mass storage device is coupled to the processor and stores user preference data and user file data that may be accessed by the processor. According to another aspect of the present invention, the mass storage device may be omitted and the network communication circuit may be a broadband device, such as a cable modem or DSL modem.

According to another aspect of the present invention, a network computer system includes a processor and a memory device coupled to the processor. The memory device contains an embedded operating system that is executed by the processor, the embedded operating system including at least one system parameter. A first reset device is coupled to the memory device, the first reset device being operable, when activated, to set at least one of the system parameters of the embedded operating system to a desired value. A network communication circuit is coupled to the processor; the network communication circuit being adapted to allow the processor to communicate over a computer network with computer resources coupled to the network. A mass storage device is coupled to the processor and includes a user preferences partition and a user file data partition that contain user preference data and user file data, respectively, that may be accessed by the processor. A second reset device is coupled to the mass storage device and is operable, when activated, to set at least some of the user preference data to desired values. A third reset device is coupled to the mass storage device and is operable, when activated, to set at least some of the user file data to desired values.

According to further aspects of the present invention, each of the first, second, and third reset devices may include a switch having an actuator that is adapted to be activated in response to a physical action of a user and the memory device includes a FLASH memory device.

DETAILED DESCRIPTION OF THE INVENTION

Figure 1:
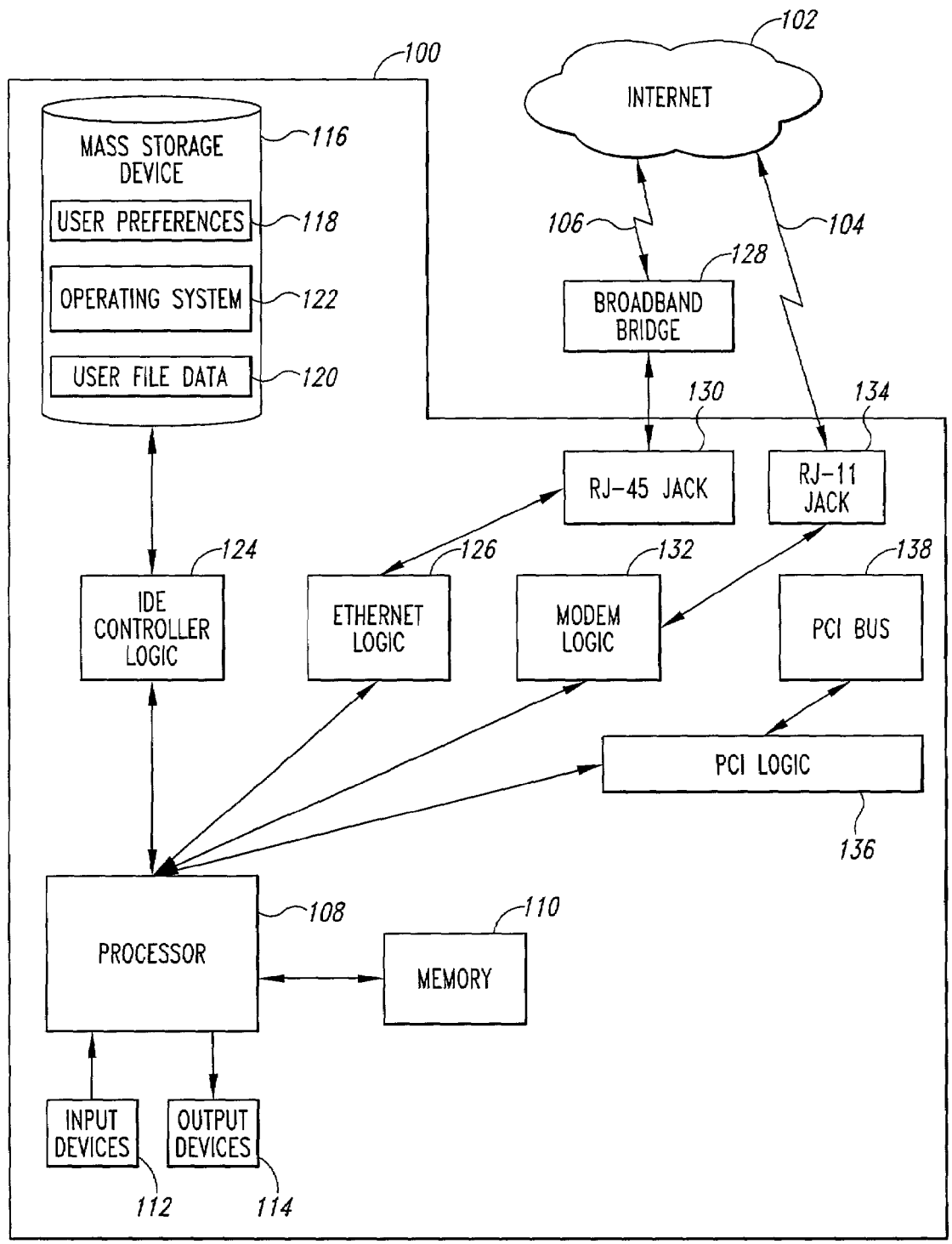
FIG. 1 is a functional block diagram of a conventional computer system coupled to the Internet.
Figure 2:
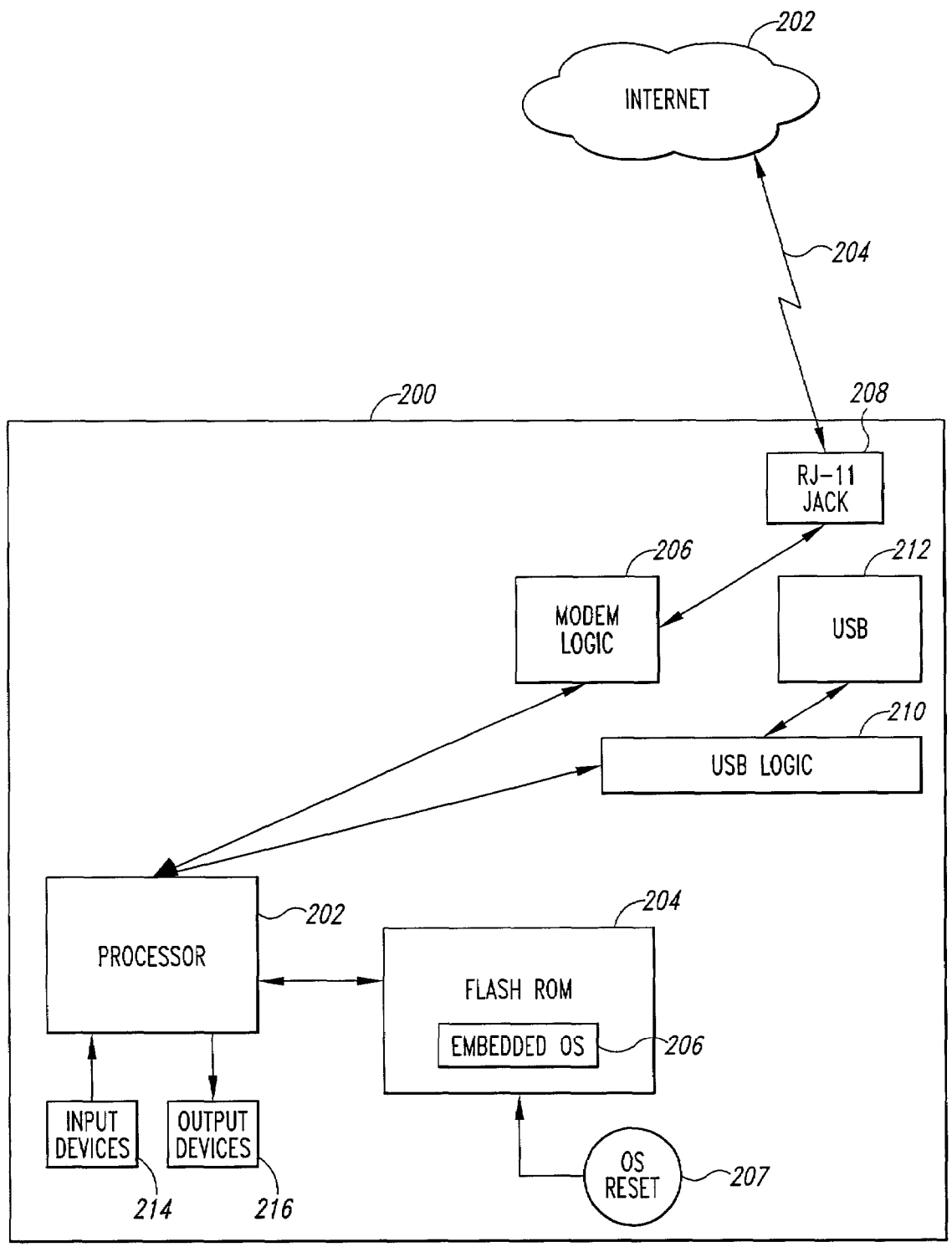
FIG. 2 is a functional block diagram of a conventional Internet appliance or network computer coupled to the Internet.
Figure 3:
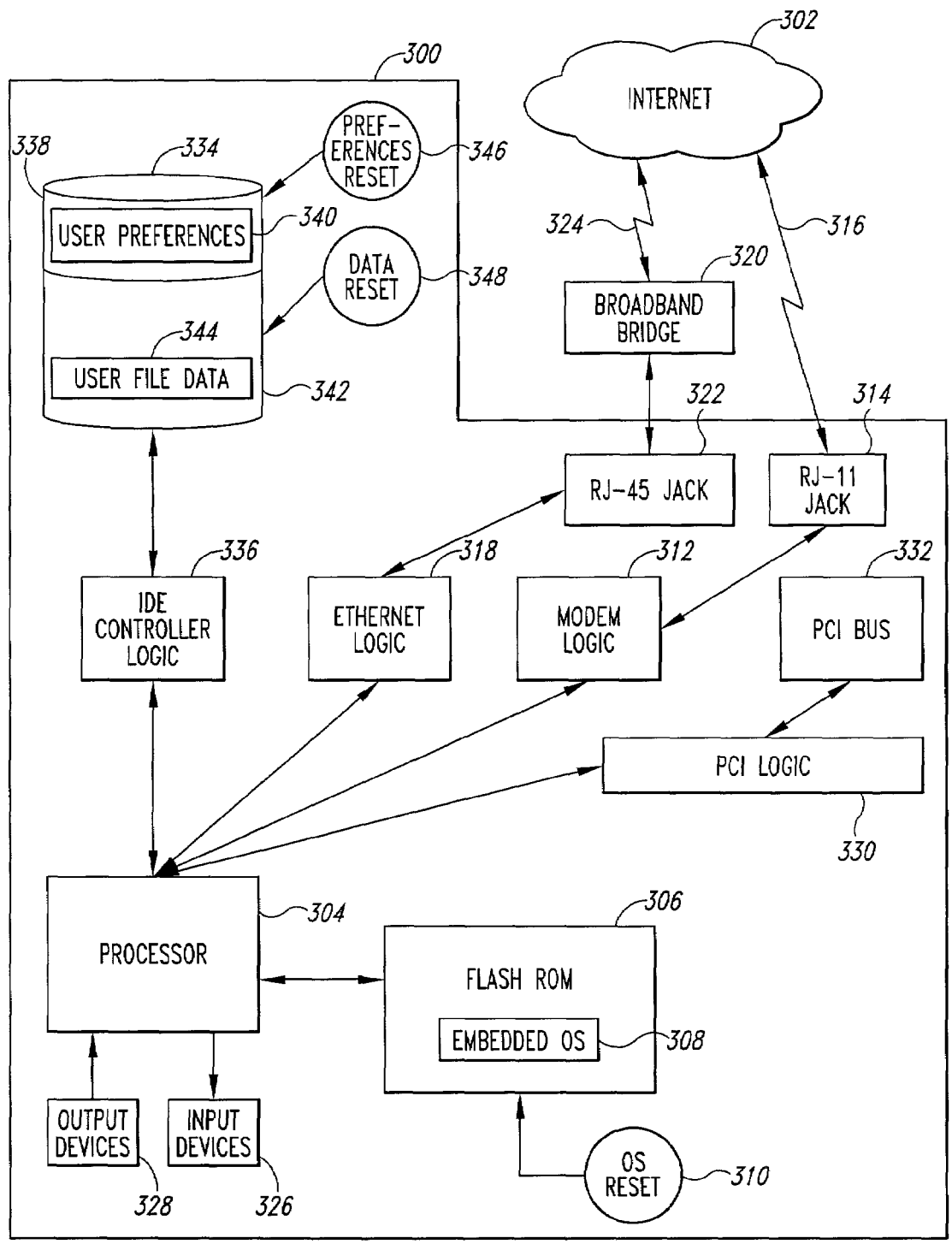
FIG. 3 is a functional block diagram of a network computer that provides mass storage, broadband access to a computer network, and other enhanced functionality according to one embodiment of the present invention.

FIG. 3 is a functional block diagram of a network computer 300 that provides mass storage, broadband access to a computer network 302 such as the Internet, and provides other enhanced functionality to simplify and improve user operation according to one embodiment of the present invention. The network computer 300 gives users a low cost Internet-access device having enhanced functionality relative to the conventional network computer 200 of FIG. 2 while also having simplified operation relative to the conventional computer system 100 of FIG. 1, as will be described in more detail below. In the following description, certain details are set forth to provide a sufficient understanding of the present invention. However, it will be clear to one skilled in the art that the present invention may be practiced without these particular details. In other instances, well-known software components and operations, along with ancillary circuits, signals, and communication protocols have not been shown in detail in order to avoid unnecessarily obscuring the present invention.

The network computer 300 includes a processor 304 that executes programs stored in a FLASH memory 306 under control of an embedded operating system 308, which is also stored in the FLASH memory. The embedded operating system 308 may be any of a variety of embedded operating systems that support the hardware components of the network computer 300, such as Windows CE, QNX, Wind River, Embedded LINUX, and so on. A reset device 310, such as a push-button switch, resets configurable parameters of the embedded operating system 308 in the event the network computer 300 "locks up" during operation, which may occur, for example, if the user misconfigures the embedded operating system as previously discussed.

A modem a logic circuit 312 is coupled through a conventional RJ-11 jack 314 to a POTS communications link 316 and provides the processor 304 with a conventional low-speed communications channel over which the processor can access the Internet 302. An Ethernet logic circuit 318 provides the processor 304 with a high speed communications channel over which the processor communicates with a broadband bridge device 320, which is coupled to the Ethernet logic circuit through a conventional RJ-45 jack 322. The broadband bridge device 320 is typically a cable modem or digital subscriber line (DSL) modem that transfers data to and from the processor 304 through the Ethernet logic circuit 318 and transfers data to and from the Internet 302 via a broadband communications link 324. Typically, the computer system 300 will utilize only one of the Ethernet logic circuit 318 and the modem logic circuit 312 in accessing the Internet 302, as will be appreciated by those skilled in the art.

The network computer 300 further includes input devices 326 such as a keyboard and mouse to allow a user to provide input to a program running on the processor 304, and also includes output devices 328 such as a display screen to allow the processor to provide output to a user of the network computer. A peripheral component interconnect (PCI) logic circuit 330 provides the processor 304 with access to peripheral components (not shown) coupled to a PCI bus 332. The network computer 300 may also include a universal serial bus (USB) logic circuit (not shown) and associated USB port (not shown) through which the processor 304 communicates with peripheral devices coupled to the USB port, as will be appreciated by those skilled in the art.

The network computer 300 also includes a mass storage device 334 which the processor 304 accesses through an intelligent drive electronics (IDE) controller logic circuit 336. The mass storage device 334 is subdivided into a user preferences segment 338 that stores user preference data 340 and a user data segment 342 that stores user file data 344. Each of the user preferences segment 338 and user data segment 342 may be independently reset by a preferences reset device 346 and a data reset device 348, respectively, to reset the user preferences data 340 and user file data 344 stored in the segments. The mass storage device 334 may be a hard disk, CD-RW drive, or other suitable mass storage device, as will be appreciated by those skilled in the art. When the mass storage device 334 is a hard disk, the hard disk is partitioned into the user preferences segment 338 and user data segment 342.

The network computer 300 provides a relatively low cost alternative to the conventional computer system 100 (FIG. 1) for users merely requiring an Internet-access device while simultaneously providing such users with enhanced performance and functionality relative to the conventional network computer 200 of FIG. 2. First, the network computer 300 provides the user with much faster access to the Internet 302 via the Ethernet logic circuit 318, broadband bridge device 320, and the broadband communications link 324. This greatly improves the user experience while accessing the Internet 302 by downloading files, including Web pages, to the network computer 300 much more quickly so that the user need not experience excessive delays when accessing Web sites or other content on the Internet. In addition, the network computer 300 includes the mass storage device 334 that enables the user to download and store desired files, such as audio, video, and email files, which is a function most users want to perform when accessing the Internet 302. As previously mentioned, in the conventional network computer 200 of FIG. 2 the absence of a mass storage device prohibited the downloading and storage of a reasonable number of files due to the limited storage capacity of the FLASH memory 204 (FIG. 2).

The network computer 300 also provides enhanced functionality compared to the conventional network computer 200 of FIG. 2 which makes the network computer 300 more user-friendly, as will now be described in more detail. The embedded operating system reset device 310, user preferences reset device 346, and data reset device 348 allow a user to independently reset corresponding components of the network computer 300. For example, if the user misconfigures the embedded operating system 308, the user may reset configuration parameters in the embedded operating system without affecting user file data 344 or user preferences data 340 stored on the mass storage device 334. Moreover, each of the user preferences data 340 and user file data 344 may be independently reset. For example, the user preferences data 340 stored in the user preferences segment 338 may include user configuration parameters outside the embedded operating system 308, such as a user's favorite Web sites, background images, spell check dictionaries, and so on. The user may reset this user preferences data 340 without affecting user file data 344 such as audio, video, and text files, as well as e-mails and associated attachments, multi-media objects, and the like, which are stored in the user file data segment 342 on the mass storage device 334.

In one embodiment of the network computer 300, a second Ethernet or other network card is coupled to the PCI bus 332 to couple the network computer to a second computer network (not shown). A software router program is then loaded into the FLASH memory 306 to allow the network computer 300 to function as a router and provide Web-caching of files on the mass storage device 334. In this embodiment, the network computer 300 functions as a cache for downloaded Web pages so that other users coupled to the second computer network may access the cached Web pages on the mass storage device 334 when the other users attempt to access such Web pages.

It is to be understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

The invention claimed is:

1. A network computer system, comprising:
   a processor;
   a memory device coupled to the processor, the memory device containing an embedded operating system that is executed by the processor;
   a network communication circuit coupled to the processor; the network communication circuit being adapted to allow the processor to communicate over a computer network with computer resources coupled to the network;
   a mass storage device coupled to the processor, the mass storage device having a first partition for storing user preference data and a second partition for storing user file data that may be accessed by the processor; and
   a user preference reset device and a user file data reset device coupled to the mass storage device, the user preference reset device operable to reset at least some of the user preference data independently of resetting user file data when activated and the user file data reset device operable to reset at least some of the user file data independently of resetting user preference data when activated.

2. The network computer of claim 1 wherein the network communication circuit comprises a broadband communications device.

3. The network computer of claim 2 wherein the broadband communications device comprises a cable modem.

4. The network computer of claim 2 wherein the broadband communications device comprises a DSL modem.

5. The network computer of claim 1 wherein the mass storage device comprises a hard disk.

6. The network computer of claim 5 wherein the hard disk comprises a user preferences partition and a user file data partition that store associated user preference data and user file data, respectively, with the data in each partition being capable of being set to desired values independently of the data in the other partition.

7. The network computer of claim 1 wherein the embedded operating system includes system parameters having associated default values, at least some the default values being adjustable, and the memory device comprises a reset device for resetting the system parameters to the default values.

8. The network computer of claim 1 wherein the memory device comprises a FLASH memory device.

9. The network computer of claim 1 wherein the processor comprises a microprocessor and associated support components, and includes a user input and a user output device.

10. A network computer system, comprising:
a processor;
a memory device coupled to the processor, the memory device containing an embedded operating system that is executed by the processor;
a broadband network communication circuit coupled to the processor; the broadband network communication circuit being adapted provide the processor with broadband access to a computer network to thereby access computer resources coupled to the computer network; and
a mass storage device coupled to the processor, the mass storage device having a first partition for storing user preference data and a second partition for storing user file data that may be accessed by the processor, the mass storage device having a user preferences reset device and a user file data reset device, the user preferences reset device operable to reset at least some of the user preferences data without reset of the user file data when activated and the user file data reset device operable to reset at least some of the user file data without reset of the user preferences data when activated.

11. The network computer of claim 10 wherein the broadband network communications circuit comprises a cable modem.

12. The network computer of claim 10 wherein the broadband network communications circuit comprises a DSL modem.

13. The network computer of claim 10 wherein the mass storage device comprises a hard disk.

14. The network computer of claim 13 wherein the hard disk comprises a user preferences partition and a user file data partition that store associated user preference data and user file data, respectively, with the data in each partition being capable of being set to desired values independently of the data in the other partition.

15. The network computer of claim 10 wherein the embedded operating system includes system parameters having associated default values, at least some the default values being adjustable, and the memory device comprises a reset device for resetting the system parameters to the default values.

16. The network computer of claim 10 wherein the memory device comprises a FLASH memory device.

17. The network computer of claim 10 wherein the processor comprises a microprocessor and associated support components, and includes a user input device and a user output device.

18. A network computer system, comprising:
a processor;
a memory device coupled to the processor, the memory device containing an embedded operating system that is executed by the processor, the embedded operating system including at least one system parameter;
a first reset device coupled to the memory device, the first reset device operable, when activated, to set at least one of the system parameters of the embedded operating system to a desired value;
a network communication circuit coupled to the processor; the network communication circuit being adapted to allow the processor to communicate over a computer network with computer resources coupled to the network; and
a mass storage device coupled to the processor, the mass storage device including a user preferences partition and a user file data partition that contain user preference data and user file data, respectively, that may be accessed by the processor;
a second reset device coupled to the mass storage device, the second reset device operable, when activated, to set at least some of the user preference data to desired values independently of setting any of the system parameters set by the first reset device; and
a third reset device coupled to the mass storage device, the third reset device operable, when activated, to set at least some of the user file data to desired values independently of setting any of the system parameters set by the first reset device.

19. The network computer of claim 18 wherein the network communication circuit comprises a broadband communications device.

20. The network computer of claim 18 wherein the network communication circuit comprises a cable modem.

21. The network computer of claim 20 wherein the network communication circuit comprises a DSL modem.

22. The network computer of claim 18 wherein the mass storage device comprises a hard disk.

23. The network computer of claim 18 wherein each of the first, second, and third reset devices comprises a switch having an actuator that is adapted to be activated in response to a physical action of a user.

24. The network computer of claim 18 wherein the memory device comprises a FLASH memory device.

25. The network computer of claim 18 wherein the processor comprises a microprocessor and associated support components, and includes a user input and a user output device.

26. The network computer of claim 18 wherein the memory device contains a router program that is executed by the processor to operate the network computer in a Web-caching mode of operation, and the network communication circuit is adapted to allow the processor to communicate over a second computer network, the processor executing the router program to cache files on the mass storage device and provide users coupled to the second computer network with selected cached files responsive to user requests for the selected files.

27. A method of operating a network computer system including a processor and a memory device coupled to the processor, the memory device containing an embedded operating system that is executed by the processor, and the embedded operating system including at least one system parameter, the method comprising:
  providing the processor with broadband access via a computer network to computer resources coupled to the network;
  providing mass storage for user preference data and user file data in a user preferences location and a user file data location, respectively, the data being accessible by the processor; and
  independently resetting system parameters associated with the embedded operating system, user preference data, and user file data in response to first, second, and third reset requests, respectively.

28. The method of claim 27 wherein the first, second, and third reset requests comprise respective physical actions of a user.

29. The method of claim 27 wherein providing mass storage for user preference data and user file data in a user preferences location and a user file data location, respectively, comprises providing for storage on a hard disk and the user preferences location and user file data location correspond to a user preferences partition and a user filed data partition, respectively, on the disk.

* * * * *

UNITED STATES PATENT AND TRADEMARK OFFICE
CERTIFICATE OF CORRECTION

PATENT NO. : 7,461,139 B2  
APPLICATION NO. : 09/932241  
DATED : December 2, 2008  
INVENTOR(S) : Rollins Page 1 of 1

It is certified that error appears in the above-identified patent and that said Letters Patent is hereby corrected as shown below:

In column 6, line 57, in Claim 1, delete "preference" and insert -- preferences --, therefor.

In column 6, lines 58-59, in Claim 1, delete "preference" and insert -- preferences --, therefor.

In column 6, line 60, in Claim 1, delete "preference" and insert -- preferences --, therefor.

Signed and Sealed this

Third Day of February, 2009

JOHN DOLL  
*Acting Director of the United States Patent and Trademark Office*